United States Patent
Adsumilli et al.

(10) Patent No.: US 9,786,077 B2
(45) Date of Patent: Oct. 10, 2017

(54) UNIFIED IMAGE PROCESSING FOR COMBINED IMAGES BASED ON SPATIALLY CO-LOCATED ZONES

(71) Applicant: GoPro, Inc., San Mateo, CA (US)

(72) Inventors: Balineedu Chowdary Adsumilli, San Mateo, CA (US); Timothy MacMillan, LaHonda, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/872,063

(22) Filed: Sep. 30, 2015

(65) Prior Publication Data

US 2017/0091970 A1   Mar. 30, 2017

(51) Int. Cl.
*G06K 9/36* (2006.01)
*G06T 11/60* (2006.01)
*G06T 3/40* (2006.01)
(Continued)

(52) U.S. Cl.
CPC ............ *G06T 11/60* (2013.01); *G06T 3/4038* (2013.01); *G06T 7/50* (2017.01); *G06T 7/73* (2017.01);
(Continued)

(58) Field of Classification Search
CPC ........... H04N 13/0497; H04N 13/0051; H04N 13/0242; H04N 13/025; H04N 13/0296;
(Continued)

(56) References Cited

U.S. PATENT DOCUMENTS

| | | | | |
|---|---|---|---|---|
| 8,890,954 B2* | 11/2014 | O'Donnell | ............ | G08C 17/02 348/143 |
| 2005/0004456 A1* | 1/2005 | Thomas | ................. | A61B 90/39 600/431 |
| 2006/0055710 A1* | 3/2006 | Lo | ............................ | G09G 5/14 345/629 |
| 2015/0117784 A1* | 4/2015 | Lin | ...................... | G06K 9/4671 382/195 |

OTHER PUBLICATIONS

International Search Report and Written Opinion, PCT/US2016/041149, dated Dec. 19, 2016 (Dec. 19, 2016).
(Continued)

*Primary Examiner* — Eueng-Nan Yeh
(74) *Attorney, Agent, or Firm* — Young Basile Hanlon & MacFarlane, P.C.

(57) ABSTRACT

A unified image processing algorithm results in better post-processing quality for combined images that are made up of multiple single-capture images. To ensure that each single-capture image is processed in the context of the entire combined image, the combined image is analyzed to determine portions of the image (referred to as "zones") that should be processed with the same parameters for various image processing algorithms. These zones may be determined based on the content of the combined image. Alternatively, these zones may be determined based on the position of each single-capture image with respect to the entire combined image or the other single-capture images. Once zones and their corresponding image processing parameters are determined for the combined image, they are translated to corresponding zones each of the single-capture images. Finally, the image processing algorithms are applied to each of the single-capture images using the zone-specified parameters.

25 Claims, 10 Drawing Sheets

(51) Int. Cl.
*G06T 7/73* (2017.01)
*G06T 7/50* (2017.01)

(52) U.S. Cl.
CPC ............... *G06T 2207/20021* (2013.01); *G06T 2207/20221* (2013.01); *G06T 2207/30244* (2013.01)

(58) Field of Classification Search
CPC .. H04N 13/0447; H04N 5/04; H04N 5/23238; H04N 21/4223; G06K 9/32; G06K 9/00268; G06K 2009/2045; G06K 2215/111; G06T 11/00; G06T 7/0028; G06T 7/0038
See application file for complete search history.

(56) References Cited

OTHER PUBLICATIONS

Kurillo Gregorij et al, "Geometric and Color Calibration of Multiview Panoramic Cameras for Life-Size 3D Immersive Video"; 2013 International Conference on 3DVision, IEEE, Jun. 29, 2013 (Jun. 29, 2013), pp. 374-381.
Espen Oldeide Helgedagsrud, "Efficient implementation and processing of a real-time panorama video pipeline with emphasis on dynamic stitching" Nov. 21, 2013 (Nov. 21, 2013), pp. 1-83, Retrieved from the Internet; URL: https://heim.ifi.uio.no/paalh/students/EspeOldeideHelgedagsrud.pdf; retrieved on Sep. 15, 2016.
Wilburn B et al; "High Performance Imaging Using Large Camera Array" ACM Transactions on Graphics (TOG), vol. 24,Nr:3, pp. 765-776 vol. 24, No. 3, Jul. 2005.

\* cited by examiner

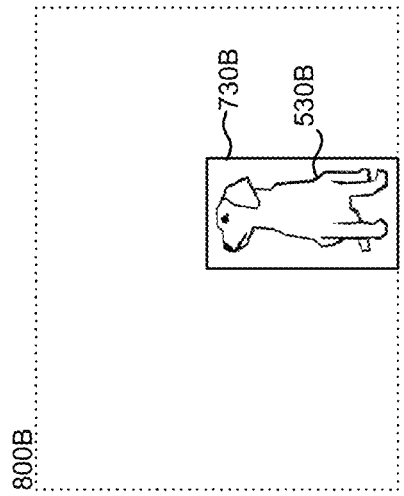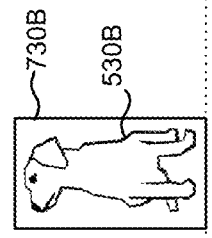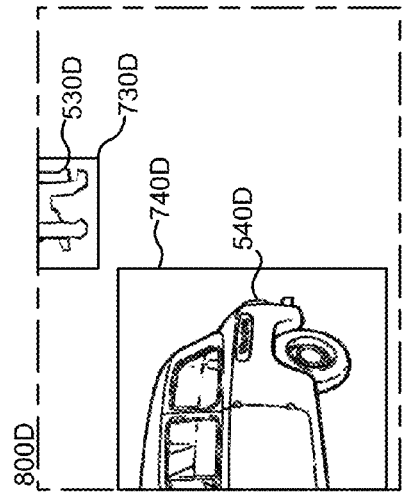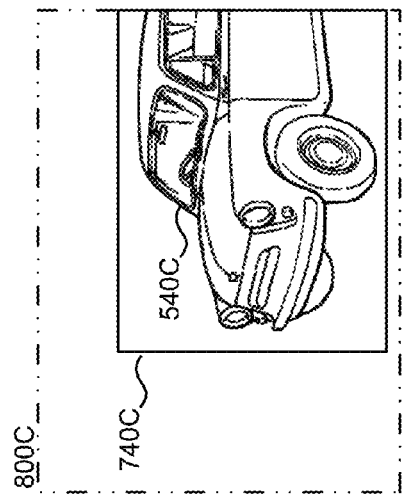
FIG. 8A
FIG. 8B
FIG. 8C
FIG. 8D

UNIFIED IMAGE PROCESSING FOR COMBINED IMAGES BASED ON SPATIALLY CO-LOCATED ZONES

BACKGROUND

Technical Field

This disclosure relates to image processing, and more specifically to unified image processing algorithms for combined images.

Description of the Related Art

Conventionally, image processing algorithms are optimized for single-capture images. However, applying those image-processing algorithms to combined images made up of multiple single-capture images can result in sub-optimal image quality. In such processes, image processing parameters are determined for each single-capture image in the combined image independently, neglecting the context of the single-capture image within the combined image. Thus, mismatching image processing algorithms may be applied to overlapping portions of the single-capture images, resulting in regions of different single-capture images that contain the same content appearing differently in each image.

Conventional methods for resolving this issue include process- or feature-matching around image borders or stitch lines, and pre-matching and locking features. However, the former results in low image quality, while the latter prevents the cameras from being adaptable to changing conditions (such as changing viewpoints or capture orientations, changing lighting conditions, moving objects, and the like). Furthermore, these methods can result in inefficient stitching and compression when combining single-capture images.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIGS. 5A-D illustrate single-capture images from cameras in a 2×2 multi-camera array, according to one embodiment.

Figure 6:
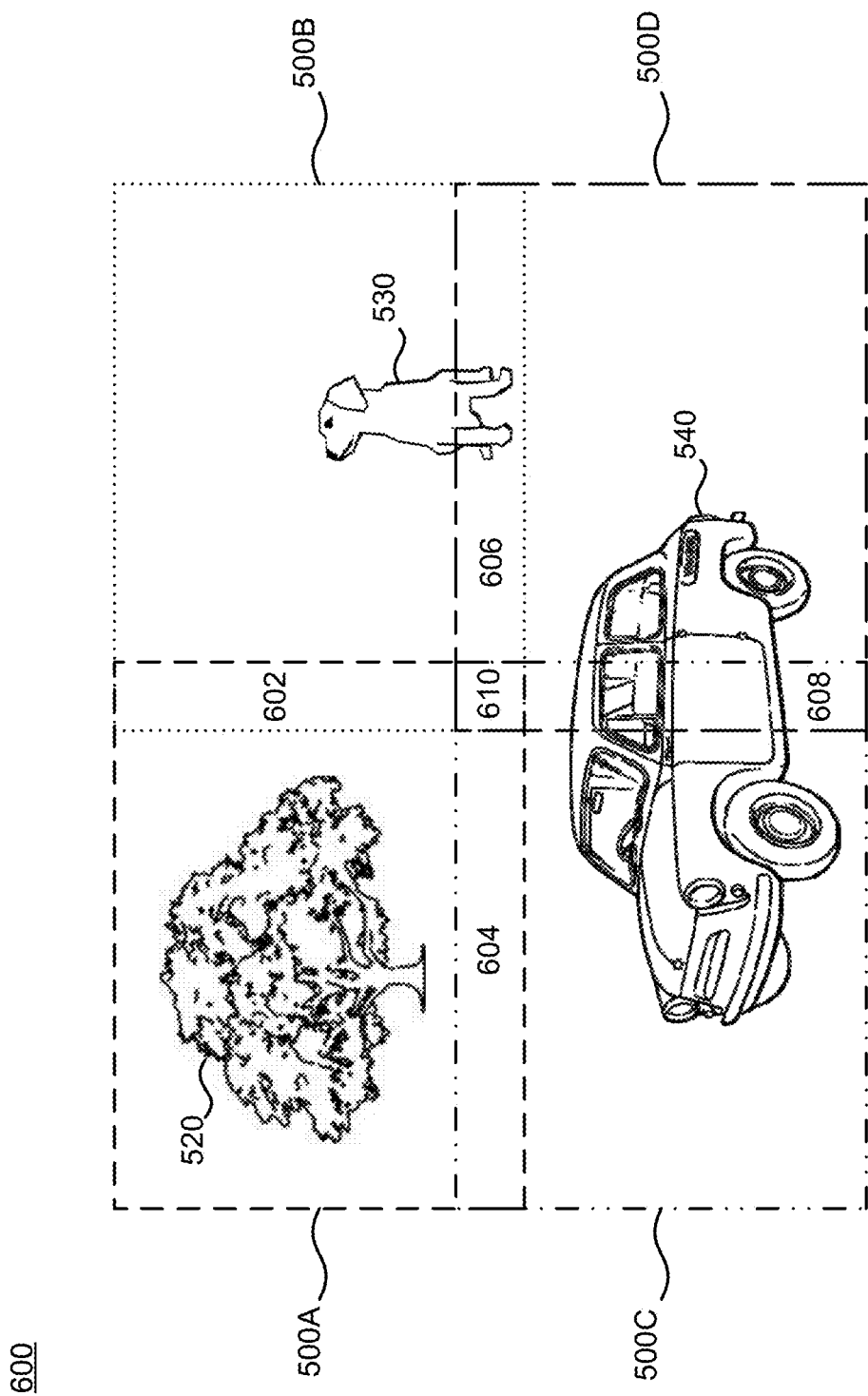

FIG. 6 illustrates a combined image formed from a plurality of single-capture images from a 2×2 multi-camera array, according to one embodiment.

Figure 7:
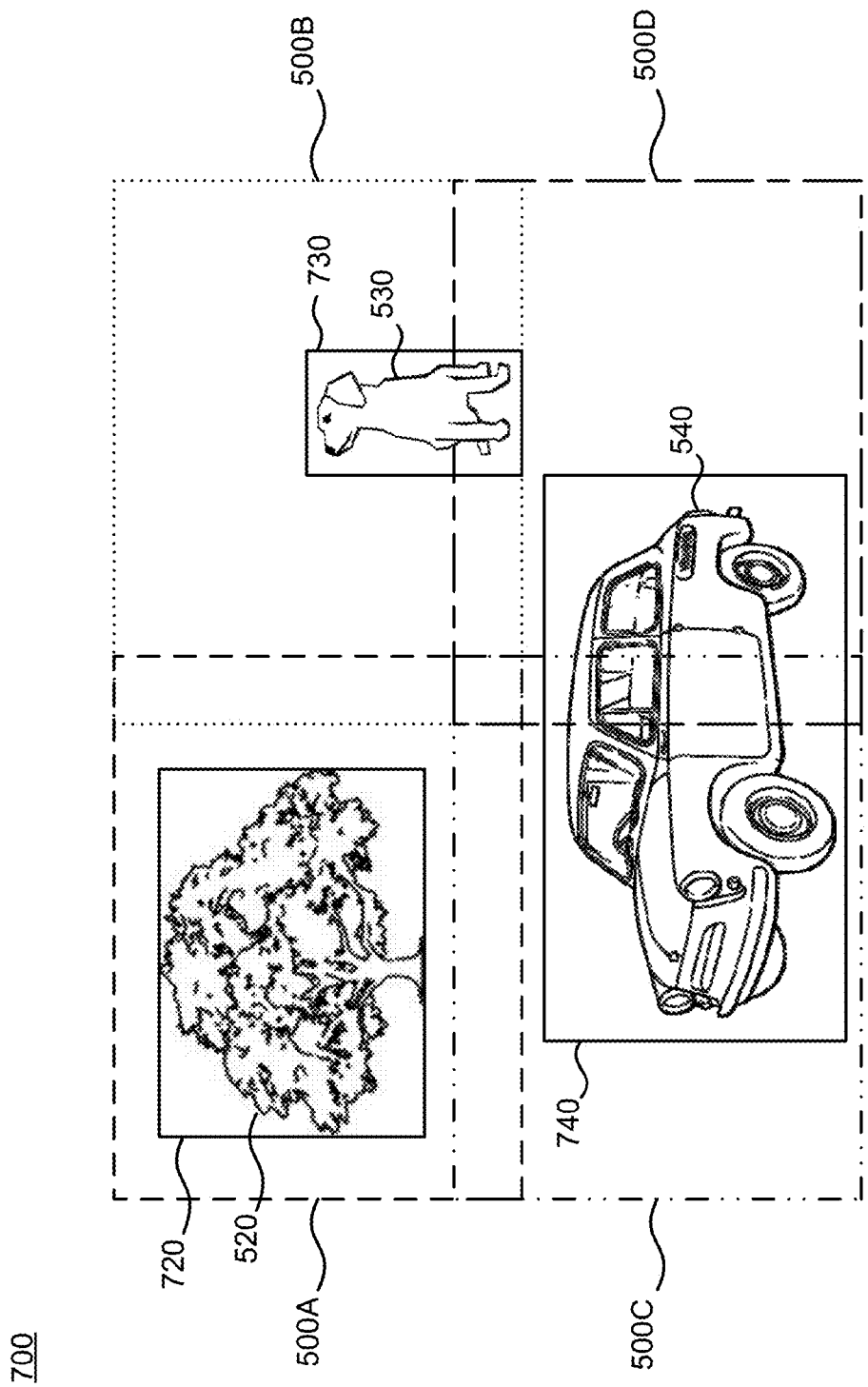

FIG. 7 illustrates a combined image with zones identified based on image features, according to one embodiment.

FIGS. 8A-D illustrate single-capture images with identified image feature zones determined based on the combined image of FIG. 7, according to one embodiment.

Figure 9:
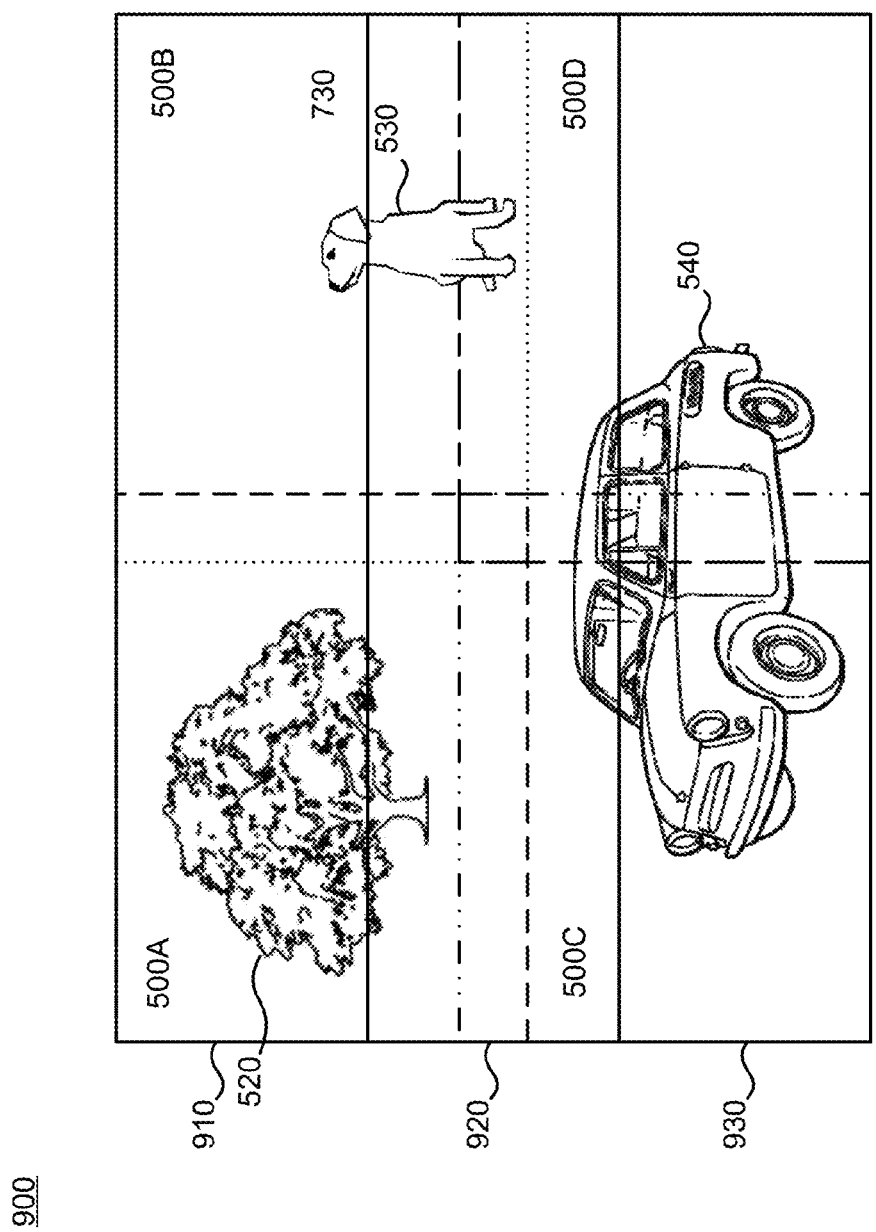

FIG. 9 illustrates a combined image with spatial zones, according to one embodiment.

FIGS. 10A-D illustrate single-capture images with identified spatial zones determined based on the combined image of FIG. 9, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Compared to conventional image processing algorithms, unified image processing algorithms result in better post-processing quality for combined images. As used herein, "combined image" refers to an image made up of multiple single-capture images. As used herein, "single-capture" image refers to an image captured by one camera. To ensure that each single-capture image is processed in the context of the entire combined image (as opposed to individually, where the image conditions may vary from image to image), the combined image is analyzed to determine or identify portions of the image (referred to as "zones") that should be processed uniformly, or with the same parameters for various image processing algorithms applied to the zones. These zones may be determined based on the content of the combined image. Alternatively, these zones may be determined based on the position of each single-capture image with respect to the entire combined image or the other single-capture images. Alternatively still, these zones may be determined based on sensor configurations, the locations of the images formed on the sensors, or other lens parameters. These lens parameters can include orientation, point of view, and field of view. In some embodiments, zones may be determined based on the position of the capturing camera in the multi-camera array. In other embodiments, zones may be determined based on external sensor data, such as gyroscope, accelerometer, global positioning satellite (GPS), and altimeter data.

Once zones and corresponding image processing parameters are identified for the combined image, the zones and corresponding image processing parameters are translated to corresponding zones and parameters for each of the single-capture images. Any zone that encompasses portions of two or more single-capture images is split between those single-capture images while still maintaining the same image processing parameters. Thus, zones that overlap more than one of the single-capture images have the same image processing parameters for each of the corresponding portions of the single-capture images. Finally, image processing algorithms are applied to each of the single-capture images using the zone-specified parameters.

Example Camera Array Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

A camera array configuration includes a plurality of cameras, each camera having a distinctive field of view. For example, the camera array can include a 2×1 camera array, a 2×2 camera array, or any other suitable arrangement of cameras. Each camera can have a camera housing structured to at least partially enclose the camera. Alternatively, the camera array can include a camera housing structured to enclose the plurality of cameras. Each camera can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. In another embodiment, the camera array includes some or all of the various indicators, various input mechanisms, and electronics and includes the plurality of cameras. A camera housing can include a lens window structured on the front surface of the camera housing and configured to substantially align with the camera lenses of the plurality of cameras, and one or more indicator windows structured on the front surface of the camera housing and configured to substantially align with the camera indicators.

Figure 1:
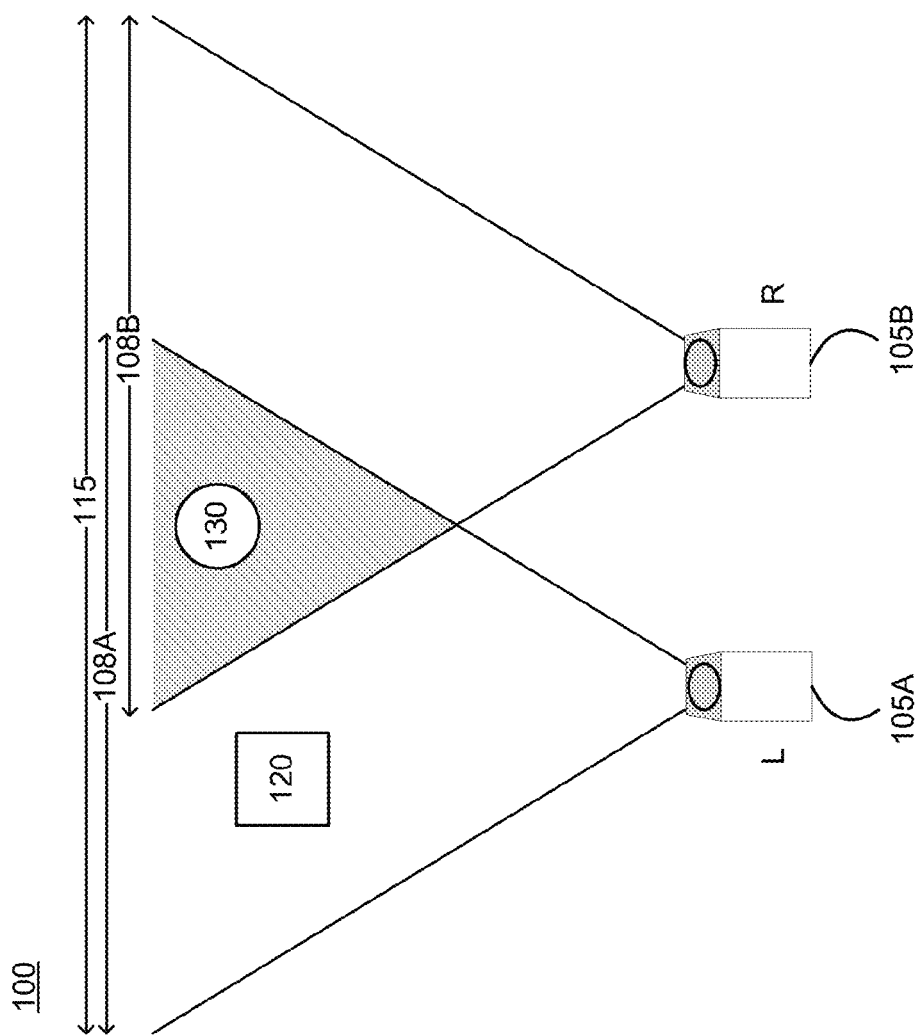
FIG. 1 illustrates a multi-camera array environment, according to one embodiment.

FIG. 1 illustrates a multi-camera array environment 100, according to one embodiment. In the embodiment, the multi-camera array environment 100 includes two cameras 105A and 105B. In this environment 100, the camera 105A is used to capture a single-capture image of a left side (e.g., field of view 108A) of a shared view 115 and the camera 105B is used to capture a single-capture image of a right side (field of view 108B) of the shared view 115. A portion of the field of view 108A of the left camera 105A and a portion of the field of view 108B of the right camera 105B represent a common field of view, as illustrated by the shaded portion of the shared view 115. Object 120 is located in field of view 108A and thus appears in the single-capture image captured by the camera 105A. Object 130 is located in both fields of view 108A and 108B (the common field of view), and thus appears in an overlap portion of both single-capture images. Based on the overlap portion of both single-capture images, the single-capture images can be combined to form a single combined image of the shared view 115.

System for Unified Image Processing

Figure 2:
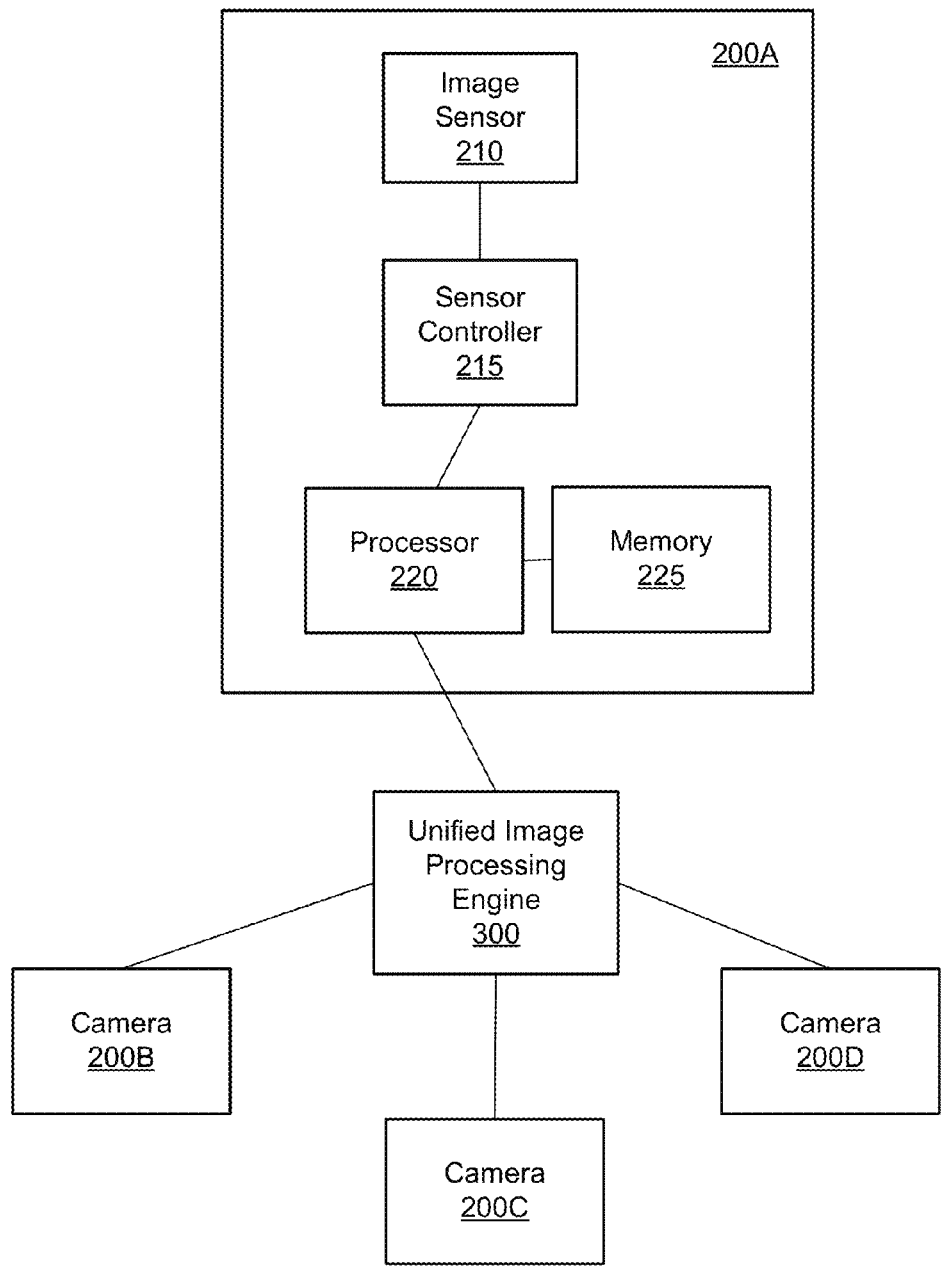
FIG. 2 is a block diagram of a multi-camera array system, according to one embodiment.

FIG. 2 illustrates a block diagram of a multi-camera array system, according to one embodiment. The multi-camera array includes four cameras 200A-D, and each camera includes an image sensor 210, a sensor controller 215, a processor 220, and memory 225. In another embodiment, the four cameras 200A-D can have image sensors 210 that share a common processor 220, and memory 225. The unified image processing engine 300 processes images associated with the four cameras 200A-D. In various embodiments, the cameras 200A-D can include additional, fewer, or different components for various applications, and the array system of FIG. 2 can include fewer or additional cameras.

The image sensor 210 is a device capable of electronically capturing light incident on the image sensor 210. In one embodiment, each image sensor 210 is a CMOS image sensor, including transistors, photodiodes, amplifiers, analog-to-digital converters, and power supplies. In one embodiment, the image sensor 210 has rolling shutter functionality, and can capture light incident upon different portions of the image sensor at slightly different times over a capture interval. Alternatively, each image sensor 210 can be a CCD sensor configured to can capture all portions of the image at substantially the same time.

The processor 220 is one or more hardware devices (e.g., a central processing unit (CPU), a graphics processing unit (GPU), a digital signal processor (DSP), and the like) that execute computer-readable instructions stored in the memory 225. The processor 220 controls other components of the camera based on the instructions that are executed. For example, the processor 220 may send electronic control signals to the image sensor 510 or use the unified image processing engine 300 to send data to cameras 200B-D.

The memory 225 is a non-transitory storage medium that can be read by the processor 220. The memory 225 may contain volatile memory (e.g., random access memory (RAM)), non-volatile memory (e.g., a flash memory, hard disk, and the like), or a combination thereof. The memory 225 may store image data captured by the image sensor 210 and computer-readable instructions to be executed by the processor 220.

The sensor controller 215 controls operation of the image sensor 210 and other functions of the camera 200A. The sensor controller 215 can include physical and/or electronic input devices, such as exterior buttons to start recording video and/or capture a still image, a touchscreen with tap-to-focus capabilities, and a dial/button combination for navigating a menu hierarchy of the camera 200A. In addition, the sensor controller 215 may include remote user input devices, such as remote controls that wirelessly communicate with the cameras 200A-D. The image sensor 210 may function independently of the sensor controller 215.

The unified image processing engine 300 receives data from and may send data to cameras 200A-D, or to any additional entity, such as an external computing system. In particular, the unified image processing engine 300 can coordinate and synchronize the capture of images by the cameras 200A-D at substantially the same time, and can, in response, receive image data from cameras 200A-D for processing. In the illustrated embodiment of FIG. 2, there is one unified image processing engine 300 associated with the cameras 200A-D. In another embodiment, there can be a plurality of unified image processing engines 300 associated with the cameras 200A-D, for instance, one unified image processing engine 300 per camera. It should be noted that in some embodiments, the unified processing engine 300 is located within one or more of the cameras 200A-D, while in other embodiments, the unified processing engine 300 is located external to the cameras 200A-D.

Figure 3:
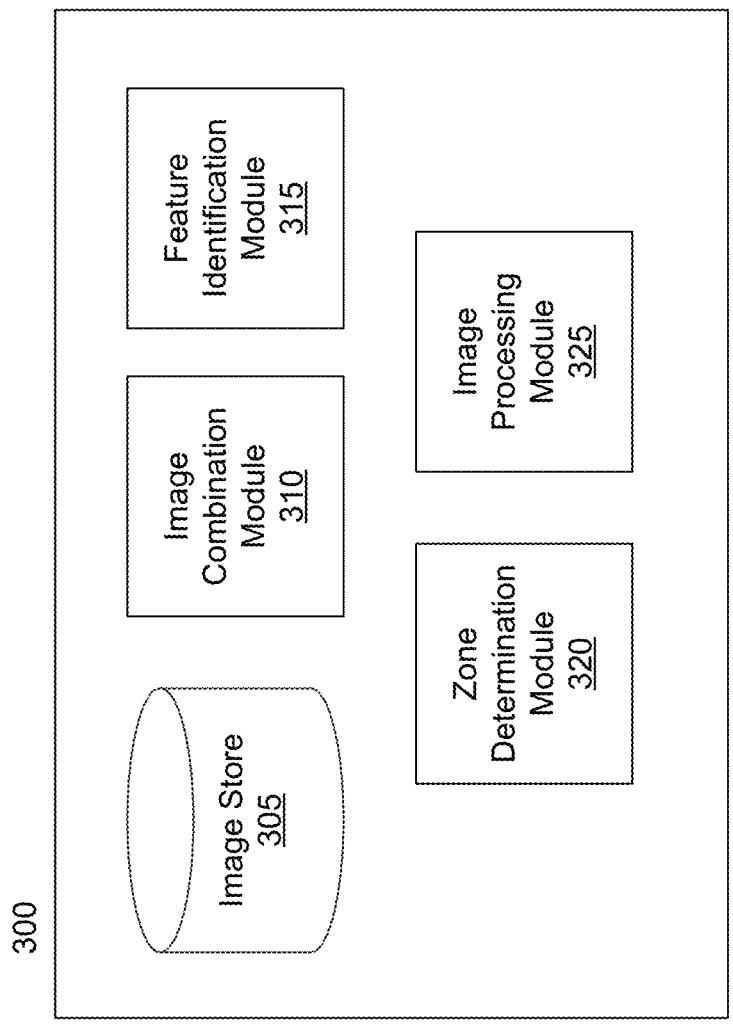
FIG. 3 is a block diagram of a unified image processing engine for a multi-camera array system, according to one embodiment.

FIG. 3 illustrates a block diagram of a unified image processing engine 300 for a multi-camera array system, according to one embodiment. The unified image processing engine 300 includes an image store 305, an image combination module 310, a feature identification module 315, a zone determination module 320, and an image processing module 325. Alternate embodiments may have one or more additional, omitted, or alternative modules configured to perform similar functionality. It should be noted that in other embodiments, the modules described herein can be implemented in hardware, firmware, or a combination of hardware, firmware, and software. In addition, in some embodiments, a first camera in a plurality of cameras includes the components illustrated in FIG. 3, while the other cameras in the plurality of cameras do not necessarily include the components of FIG. 3 and instead rely on the unified image processing engine 300 of the first camera. As used herein, a "plurality of images" refers to a plurality of images synchronously captured by the plurality of cameras, each camera capturing a portion of a field of view shared with two adjacent cameras. As used herein, the synchronous capture of images refers to the capture of images by two or more cameras at substantially the same time, or within a threshold period of time. Alternatively or additionally, an external computing device processes image data captured by the camera array according to the principles described herein.

The image store 305 is configured to store a plurality of images by each of a plurality of cameras, such as the cameras 200A-D of FIG. 2. Images in the image store 305 may be associated with other images based on when and where they were captured. For example, images captured by a multi-camera array may be stored in association with each other. Images stored in the image store 305 may be single-capture images taken by a single camera or combined images made up of multiple single-capture images taken by a plurality of cameras. Furthermore, images stored in the image store 205 may be received directly from a camera or from an external image store.

The image combination module 310 accesses the image store 305 to retrieve a plurality of single-capture images that make up a combined image. The combined image may be made up of a plurality of images representative of a shared field of view from similar angles or perspectives, resulting in flat image, or a plurality of images representative of a shared field of view from significantly different angles or perspectives, resulting in a curved image. The image combination module 310 combines the plurality of images algorithmically. When combining the single-capture images, the image combination module 310 may adjust the images to compensate for the angled fields of view of the cameras of the camera array. The images are adjusted using, for example warps, transformations, crops, or any other suitable image enhancement, restoration, and/or compression techniques. One or more of the images can be adjusted individually, or all of the images can be adjusted substantially synchronously or sequentially. In some embodiments, the image combination module 310 combines the plurality of images based on overlapping regions of the images. Examples of image combination or "stitching" techniques can be found in co-pending U.S. patent application Ser. No. 14/308,507, titled "Image Taping in a Multi-Camera Array", filed Jun. 18, 2014; U.S. patent application Ser. No. 14/754,694, titled "Image Stitching in a Multi-Camera Array", filed Jun. 30, 2015; and U.S. patent application Ser. No. 14/637,180, titled "Generation of Video from Spherical Content Using Edit Maps", filed Mar. 3, 2015, the contents of each of which are incorporated herein by reference in their entirety.

The feature identification module 315 identifies image features in combined images. An image feature is a point, area of interest, object, vehicle, body part, animal, or person within an image. For example, a tree may be considered an image feature if it is located in a meadow, but may not be considered an image feature if it is one of many in a forest. The feature identification module 315 can identify image features using edge or corner detection, texture detection, pattern or image recognition techniques, or any suitable method for identified features within an image. Examples of image feature identification techniques can be found in co-pending U.S. patent application Ser. No. 14/606,019, titled "Auto-Alignment of Image Sensors in a Multi-Camera System", filed Jan. 27, 2015; U.S. patent application Ser. No. 14/308,507, titled "Image Taping in a Multi-Camera Array", filed Jun. 18, 2014; U.S. patent application Ser. No. 14/637,193, titled "Automatic Generation of Video from Spherical Content Using Audio/Visual Analysis", filed Mar. 3, 2015; and U.S. application Ser. No. 14/754,696, titled "Image Stitching in a Multi-Camera Array", filed Jun. 30, 2015, the contents of each of which are incorporated herein by reference in their entirety. In some embodiments, the feature identification module 315 also identifies image features in each single-capture image. In some embodiments, the unified image processing engine 300 does not have a feature identification module 315.

The zone determination module 320 determines the locations, dimensions, and/or boundaries of zones in the combined image. Each zone encompasses a portion of the combined image and indicates that a consistent set of image processing parameters and/or a uniform image processing algorithm should be applied to the entirety of the portion of the image. Applying different parameters to different portions of an image can enhance the appearance of the image based on content contained in the image. Because of this, the zones in an image may vary based on the image processing algorithm that is to be applied.

In some embodiments, zones are determined based on image features identified by the feature identification module 315. Such zones may encompass a single identified image feature. For example, each zone may track the outline of the image feature (determined, for instance, using edge detection), may form an oval or circle around the image feature, or may form a rectangle or other shape around the image feature. Such zones may alternatively or additionally encompass multiple identified image features. Whether a particular zone encompasses one image feature or several image features can depend on the distance between image features. For example, if the distance between image features is below a threshold distance, the image features may be encompassed by a single zone. Alternatively or additionally, a zone may encompass multiple image features if they are deemed to be substantially similar, or if they overlap. For example, one zone can be determined for two image features with similar color or luminance values, and multiple zones can be determined for two image features with very different color or luminance values.

In other embodiments, zones are determined spatially or based on depth. For example, the combined image may be split into zones that are presumed to be the foreground, middle ground and background (e.g., the bottom ⅓ of the image is presumed to be the foreground, the middle ⅓ of the image is presumed to be the middle ground, and the top ⅓ of the image is presumed to be the background). In some embodiments, zones are identified based on depth determined from parallax information from a plurality of cameras in the camera array. A zone may also be determined based on the position of the zone within the combined image relative to the positions of the single-capture images that make up the combined images. For example, overlapping portions of a plurality of single-capture images can be determined to be in the same zone. Processing such zones may be even less computationally intensive than processing feature-based zones.

The zone determination module 320 may apply a combination of the techniques described herein. For example, a set of zones may be determined spatially, and a subset of zones can be determined from the set of zones based on image features in the combined image. In some embodiments, the boundaries of zones may be blended or blurred to allow for a smooth transition of image processing algorithms and thus image information between zones or across zone boundaries. After determining zones in the combined image, the zone determination module 320 determines corresponding zones for the individual single-capture images making up the combined image by mapping the zones determined for the combined image to the individual single-capture images as described below.

The image processing module 325 applies image processing algorithms or operations to images based on the zones determined by the zone determination module 320. The image processing algorithms may include an auto-exposure operation, a local tone mapping operation, white balance operations, luminance and chrominance balancing operations, image filters, image blending operations, image encoding or decoding operations, demosaicing operations, smoothing operations, and the like. In some embodiments, any suitable image processing operations can be applied by the image processing module 325. The image processing module 325 can tailor the same image processing algorithm to each zone by determining different parameters for the image processing algorithm for each zone. In some embodiments, the parameters for an image processing algorithm are determined for a zone based on properties of that zone, for instance based on image information corresponding to that zone. For example, a first tone map may be used to process a first zone, while a second tone map may be used to process a second zone. In this example, the first zone can include high luminance intensity, and the first tone map can be tailored to account for the high luminance intensity. Likewise, the second zone can include low luminance intensity, and the second tone map can be tailored to account for the low luminance intensity. Additional information can be found in co-pending U.S. application Ser. No. 14/872,017, titled "Separate Range Tone Mapping for Component Images in a Combined Image," filed Sep. 30, 2015, the contents of which are incorporated by reference herein in their entirety.

Method for Unified Image Processing

Figure 4:
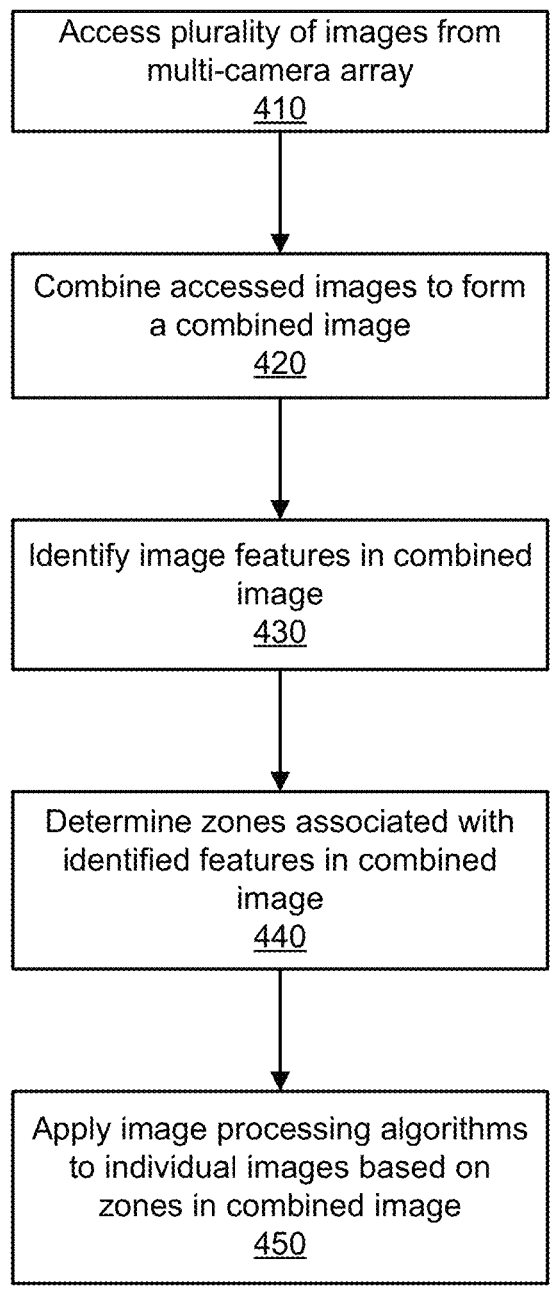
FIG. 4 is a flow chart illustrating a method for processing a combined image, according to one embodiment.
Figure 5A:
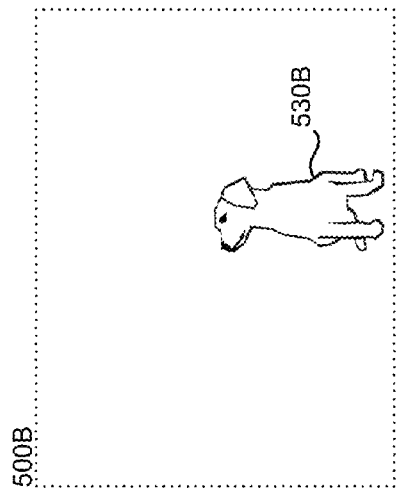
Figure 5B:
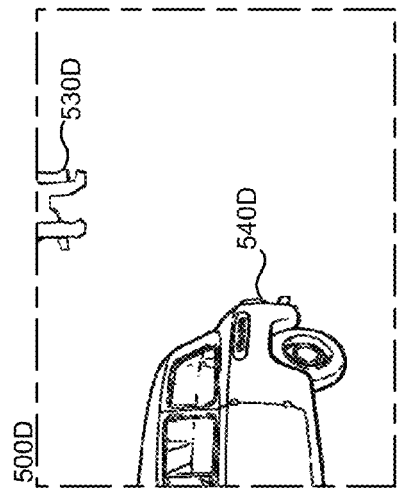
Figure 5C:
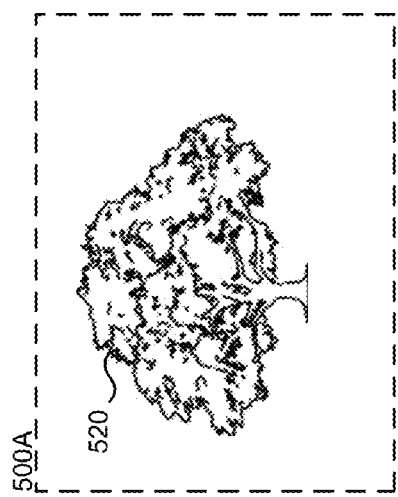
Figure 5D:
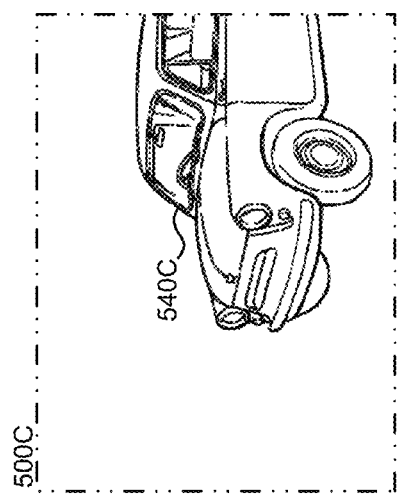

FIG. 4 is a flow chart illustrating a method for processing a combined image, according to one embodiment. The image combination module 310 accesses 410 a plurality of images from a multi-camera array. The accessed images include a set of single-capture images captured synchronously. The image combination module 310 may retrieve the images from the image store 305 or may access the images directly from cameras, such as cameras 200A-D of FIG. 2. The image combination module 310 then combines 420 the accessed images to form a single combined image.

After the combined image has been formed, the feature identification module 315 identifies 430 image features in the combined image. The zone determination module 320 then determines 440 zones associated with the identified features in the combined image. In some embodiments, the zone determination module 320 alternatively or additionally determines 440 zones spatially or based on depth as described above. In some embodiments, test images are combined 420 instead of the accessed images and the combined image formed from the test images is used to determine 440 the zones based on information that may not change between when the test images were captured and when the accessed images were captured, such as camera location relative to the multi-camera array, and lens or sensor parameters.

Finally, the image processing module 325 applies 450 image processing algorithms to the plurality of images based on zones in the combined image. For instance, the image processing module 325 may apply image processing operations to zones of the combined image, or may apply image processing operations to portions of the single-capture images corresponding to the determined zones of the combined image individually. In some embodiments, applying 450 the image processing algorithms entails determining parameters for the image processing algorithms based on the determined 440 zones. For example, different zones may have different image processing parameters or use different variations of a type of image processing algorithm. Additionally, different image processing algorithms may be applied to zones differently. For example, for Algorithm 1, Zones A and B use the same parameters and Zone C uses different parameters, while for Algorithm 2, Zones A and C use the same parameters and Zone B uses different parameters. In some embodiments, different algorithms may be applied to different sets of zones altogether.

Exemplary Combined Image and Zoning for Unified Image Processing

FIGS. 5A-D illustrate a set of single-capture images 500A-D from cameras in a 2×2 multi-camera array, according to one embodiment. Each single-capture image 500A-D is taken by a different camera in the 2×2 camera array, for instance, each of cameras 200A-D of FIG. 2. Single-capture images 500A-D each capture a different view of the same scene, and thus may share image content. Single-capture image 500A, shown in FIG. 5A, contains a tree image feature 520. Single-capture image 500B, shown in FIG. 5B, contains a dog image feature portion 530B. Single-capture image 500C, shown in FIG. 5C, contains a car image feature portion 540C. Single-capture image 500D, shown in FIG. 5D, contains another car image feature portion 540D and a dog image feature portion 530D.

FIG. 6 illustrates a combined image 600 formed from the plurality of single-capture images 500A-D from a 2×2 multi-camera array, according to one embodiment. Single-capture images 500A-D overlap such that the combined image 600 is a continuous image representative of each of images 500A-D. For example, single-capture images 500A and 500B overlap in region 602, single-capture images 500A and 500C overlap in region 604, single-capture images 500B and 500D overlap in region 606, single-capture images 500C and 500D overlap in region 608, and all four single-capture images 500A-D overlap in region 610. Additionally, image feature portions 540C and 540D, from single-capture images 500C and 500D respectively, overlap to form a single car image feature 540. Image feature portions 530B and 530D, from single-capture images 500B and 500D respectively, similarly overlap to form a single dog image feature 530.

FIG. 7 illustrates a combined image 700 with zones identified based on image features, according to one embodiment. Zoned combined image 700 has three zones 720, 730 and 740 that are based on image features 520, 530, and 540, respectively. Zone 720 encloses tree image feature 520 and is only present in single-capture image 500A. Zone 730 encloses dog image feature 530 and is present in both single-capture images 500B and 500D. Zone 740 encloses car image feature 540 and is present in both single-capture images 500C and 500D.

Though these zones are shown as rectangles, they may be any reasonable shape, such as circles, ovals, or contours matching the outlines of the image features, as noted in conjunction with the zone determination module 320 in FIG. 3. Additionally, the zoned combined image 700 may have another zone that is defined as all of the space not covered by other zones. Such a zone can be processed similar to the other zones, with a common set of image processing parameters and/or with a uniform application of an image processing operation. In some embodiments, determined zones for a particular combined image do not overlap. However, different sets of zones may be defined for different image processing algorithms, and zones from different sets may overlap.

FIGS. 8A-D illustrate single-capture images 800A-D with identified image feature zones determined based on the combined image 700 of FIG. 7, according to one embodiment. FIG. 8A shows zoned single-capture image 800A, which contains zone 720A fully encompassing tree image feature 520. Zone 720A is the projection of zone 720 from the zoned combined image 700 onto single-capture image 500A. Because zone 720 is located completely within the single-capture image 500A in the zoned combined image 700, zone 720A is exactly the same dimensions as zone 720. FIG. 8B shows zoned single-capture image 800B, which contains zone 730B fully encompassing dog image feature portion 530B. Zone 730B is the projection of zone 730 from the zoned combined image 700 onto single-capture image 500B. Again, because zone 730 from the zoned combined image 700 is located completely within the single-capture image 500B, zone 730B is exactly the same as zone 730.

FIG. 8C shows zoned single-capture image 800C, which contains zone 740C fully encompassing car image feature portion 540C. However, because zone 740 in the zoned combined image 700 is located in both single-capture images 500C and 500D, zone 740C is the portion of zone 740 that is projected onto single-capture image 500C. FIG. 8D shows zoned single-capture image 800D, which contains zone 730D fully encompassing dog image feature portion 530D and zone 740D fully encompassing car image feature portion 540D. Similar to zone 740C, zones 730D and 740D are the portions of zones 730 and 740, respectively, from the zoned combined image 700 that are projected onto the single-capture images 500C and 500D. After each zone in the single-captured images is processed (and, in some embodiments, the remainder of the single-captured images not allocated to a zone is processed), the single-capture images 800A-800D are re-combined to form a processed combined image. In some embodiments, this recombination occurs on camera, by the unified image processing engine 300, or by an external entity, such as a computing system or a cloud image processing or editing service.

As described above, a first set of image processing operations based on a first set of image processing parameters is applied to zone 720A, a second set of image processing operations based on a second set of image processing parameters is applied to both zones 730B and 730D, and a third set of image processing operations based on a third set of image processing parameters is applied to both zones 740C and 740D. In other words, even though, for instance, the portions of the images corresponding to zones 740C and 740D are processed separately, the resulting processed image portions are processed consistently and/or uniformly, preventing the formation of processing artifacts when the processed single-captured images are re-combined (such as differences in luminance). In some embodiments, the zones are processed according the principles described herein in the combined image (e.g., without separating the combined image back into zoned single-capture images).

FIG. 9 illustrates a combined image 900 with spatial zones, according to one embodiment. Because zoned combined image 900 is zoned spatially, no or reduced consideration is given to the image features 520, 530 and 540 in determining zones, and the zones are determined by on the location within the combined image. Zoned combined image 900 has three zones 910, 920 and 930 that split the image into thirds. Zone 910 encompasses the top third of the zoned combined image 900, zone 920 encompasses the middle third of the zoned combined image 900, and zone 930 encompasses the bottom third of the zoned combined image 900.

FIGS. 10A-D illustrate single-capture images 1000A-D with identified spatial zones determined based on the combined image 900 of FIG. 9, according to one embodiment. Zones 910, 920 and 930 are mapped to the zoned single-capture images 1000A-D in the same way as described within conjunction with FIGS. 8A-D.

Figure 10A:
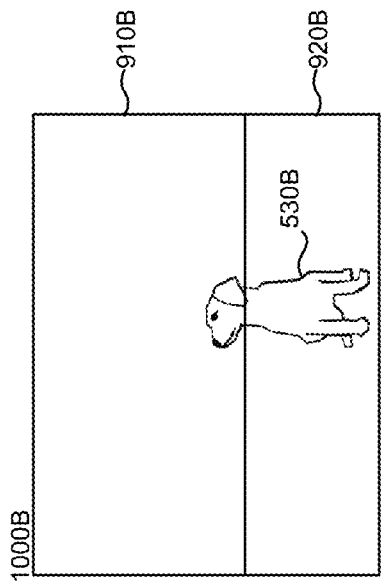
Figure 10B:
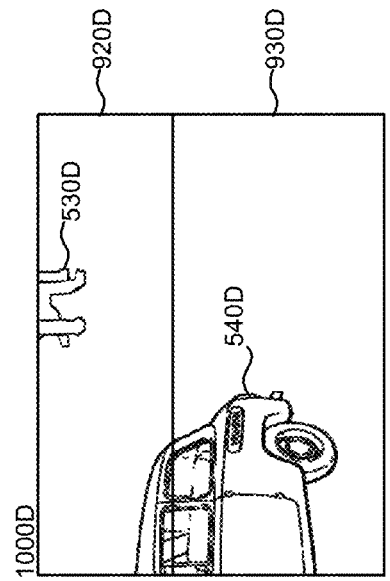

FIG. 10A shows zoned single-capture image 1000A, which has zones 910A and 920A. Zone 910A is the projection of zone 910 from the zoned combined image 900 onto single-capture image 500A, while zone 920A is the projection of zone 920 from the zoned combined image 900 onto single-capture image 500A. FIG. 10B shows zoned single-capture image 1000B, which has zones 910B and 920B. Zone 910B is the projection of zone 910 from the zoned combined image 900 onto single-capture image 500B, while zone 920B is the projection of zone 920 from the zoned combined image 900 onto single-capture image 500B.

Figure 10C:
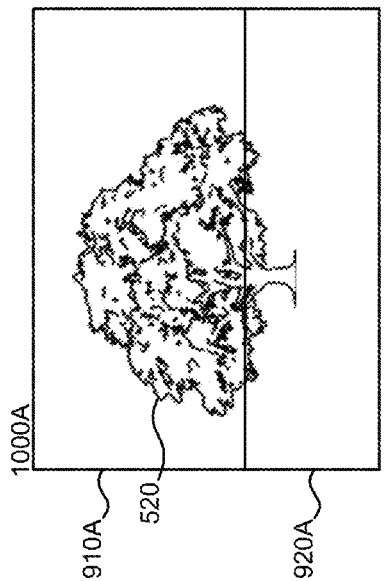
Figure 10D:
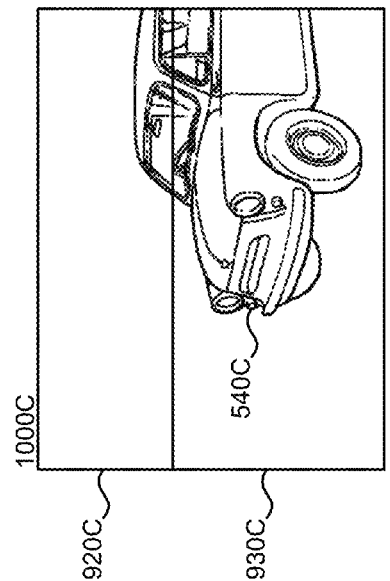

FIG. 10C shows zoned single-capture image 1000C, which has zones 920C and 930C. Zone 920C is the projection of zone 920 from the zoned combined image 900 onto single-capture image 500C, while zone 930C is the projection of zone 930 from the zoned combined image 900 onto single-capture image 500C. FIG. 10D shows zoned single-capture image 1000D, which has zones 920D and 930D. Zone 920D is the projection of zone 920 from the zoned combined image 900 onto single-capture image 500D, while zone 930D is the projection of zone 930 from the zoned combined image 900 onto single-capture image 500D.

As described herein, a first set of image processing operations based on a first set of image processing parameters is applied to zones 910A and 910B, a second set of image processing operations based on a second set of image processing parameters is applied to zones 920A, 920B, 920C, and 920D, and a third set of image processing operations based on a third set of image processing parameters is applied to both zones 930C and 930D. After the single-capture images are processed by zone, the single-capture images are recombined into a combined processed image, though in other embodiments, the zones 910, 920, and 930 are processed within the combined image without separating the combined image into zoned single-capture images.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method comprising:
   accessing a plurality of images synchronously captured by a multi-camera array;
   combining the plurality of images to form a combined image;
   determining a first plurality of zones for the combined image, each zone of the first plurality of zones encompassing a portion of the combined image, wherein no two zones of the first plurality of zones overlap;
   projecting one of the first plurality of zones onto at least two of the plurality of images to determine two or more projected zones in respective images of the plurality of images;
   performing an image processing operation with a first set of one or more parameters in the two or more projected zones of the plurality of images; and
   performing the image processing operation with a second set of one or more parameters in a different zone of the plurality of images, wherein the second set of one or more parameters is different from the first set of one or more parameters.

2. The method of claim 1, further comprising:
   identifying one or more image features in the combined image.

3. The method of claim 2, wherein each zone in the first plurality of zones corresponds to an identified image feature.

4. The method of claim 3, wherein at least one of the plurality of zones fully encompasses one of the one or more image features.

5. The method of claim 1, wherein the first plurality of zones are determined spatially.

6. The method of claim 1, wherein the first plurality of zones is determined based on depth information corresponding to the combined image.

7. The method of claim 1, wherein the first plurality of zones is determined based on a position of an image of the plurality of images on an image sensor of the multi-camera array.

8. The method of claim 1, wherein the first plurality of zones is determined based on relative locations of cameras capturing the plurality of images in the multi-camera array.

9. The method of claim 1, wherein the first plurality of zones is determined based on one or more lens parameters chosen from the group of: directionality, orientation, point of view, field of view, and allowed luminance.

10. The method of claim 1, wherein the first plurality of zones is determined based on external sensor data comprising at least one of gyroscope, accelerometer, GPS, and altimeter data.

11. The method of claim 1, further comprising:
    mapping each of the first plurality of zones in the combined image to one or more zones in the plurality of images.

12. The method of claim 11, wherein a same image processing operation is performed on overlapping zones in the plurality of images.

13. The method of claim 1, further comprising:
    determining the first set of one or more parameters based on a property of the one of the first plurality of zones.

14. The method of claim 1, further comprising:
    after performing the image processing operation, re-combining the plurality of images based on overlapping regions of the plurality of images to produce a processed combined image.

15. A system comprising:
    a processor; and
    a non-transitory computer-readable medium comprising instructions that when executed by the processor cause the processor to:
      access a plurality of images synchronously captured by a multi-camera array;
      combine the plurality of images to form a combined image;
      determine a first plurality of zones for the combined image, each zone of the first plurality of zones encompassing a portion of the combined image, wherein no two zones of the first plurality of zones overlap;
      project one of the first plurality of zones onto at least two of the plurality of images to determine two or more projected zones in respective images of the plurality of images;
      perform an image processing operation with a first set of one or more parameters in the two or more projected zones of the plurality of images; and
      perform the image processing operation with a second set of one or more parameters in a different zone of the plurality of images, wherein the second set of one or more parameters is different from the first set of one or more parameters.

16. The system of claim 15, wherein the instructions further cause the processor to: identify one or more image features in the combined image.

17. The system of claim 16, wherein each zone in the first plurality of zones corresponds to an identified image feature.

18. The system of claim 17, wherein at least one of the plurality of zones fully encompasses one of the one or more image features.

19. The system of claim 15, wherein the first plurality of zones are determined spatially.

20. The system of claim 15, wherein the first plurality of zones is determined based on depth information corresponding to the combined image.

21. The system of claim 15, wherein the instructions further cause the processor to: map each of the first plurality of zones in the combined image to one or more zones in the plurality of images.

22. The system of claim 21, wherein a same image processing operation is performed on overlapping zones in the plurality of images.

23. The system of claim 15, wherein the instructions further cause the processor to:
determine the first set of one or more parameters based on a property of the one of the first plurality of zones.

24. The system of claim 15, wherein the instructions further cause the processor to:
after performing the image processing operations, re-combine the plurality of images based on overlapping regions of the plurality of images to produce a processed combined image.

25. A non-transitory computer-readable medium comprising instructions that when executed by a processor cause the processor to:
access a plurality of images synchronously captured by a multi-camera array;
combine the plurality of images to form a combined image;
determine a first plurality of zones for the combined image, each zone of the first plurality of zones encompassing a portion of the combined image, wherein no two zones of the first plurality of zones overlap;
project one of the first plurality of zones onto at least two of the plurality of images to determine two or more projected zones in respective images of the plurality of images;
perform an image processing operation with a first set of one or more parameters in the two or more projected zones of the plurality of images; and
perform the image processing operation with a second set of one or more parameters in a different zone of the plurality of images, wherein the second set of one or more parameters is different from the first set of one or more parameters.

* * * * *